US012670929B2

(12) United States Patent
Tokizaki

(10) Patent No.: US 12,670,929 B2
(45) Date of Patent: Jun. 30, 2026

(54) RAMP AND MAGNETIC DISK DEVICE

(71) Applicants:Kabushiki Kaisha Toshiba, Tokyo (JP); Toshiba Electronic Devices & Storage Corporation, Tokyo (JP)

(72) Inventor: Tomoyuki Tokizaki, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/781,228

(22) Filed: Jul. 23, 2024

(65) Prior Publication Data

US 2025/0322845 A1      Oct. 16, 2025

(30) Foreign Application Priority Data

Apr. 10, 2024     (JP) ................................. 2024-063440

(51) Int. Cl.
 *G11B 5/54* (2006.01)
 *G11B 21/22* (2006.01)
 *G11B 5/012* (2006.01)
(52) U.S. Cl.
 CPC ............... *G11B 5/54* (2013.01); *G11B 21/22* (2013.01); *G11B 5/012* (2013.01)

(58) Field of Classification Search
 None
 See application file for complete search history.

(56) References Cited

U.S. PATENT DOCUMENTS

| | | | | |
|---|---|---|---|---|
| 6,160,686 | A * | 12/2000 | Albrecht | ............. G11B 5/5565 |
| 6,424,501 | B1 * | 7/2002 | Tsujino | ................... G11B 5/54 |
| 6,690,548 | B2 * | 2/2004 | Koyanagi | ............. G11B 21/22 |
| 6,927,943 | B1 * | 8/2005 | McGrath | ................. G11B 5/54 |
| 10,943,614 | B1 * | 3/2021 | Xu | ..................... G11B 33/1433 |
| 12,198,738 | B1 * | 1/2025 | Morita | ..................... G11B 5/54 |
| 2002/0044386 | A1 * | 4/2002 | Koyanagi | ............. G11B 21/22 |
| 2010/0226231 | A1 | 9/2010 | Kanayama et al. | |

FOREIGN PATENT DOCUMENTS

JP          2007-73168 A      3/2007

* cited by examiner

*Primary Examiner* — William J Klimowicz
(74) *Attorney, Agent, or Firm* — Kim & Stewart LLP

(57) ABSTRACT

According to one embodiment, a ramp of a magnetic disk device, includes a ramp main body and a support bracket molded to be integrated as one body from resin and a metal reinforcement plate embedded in the ramp main body and opposing the support bracket. The reinforcement plate includes an opening filled with the resin and opposing a border portion between the ramp main body and the support bracket.

8 Claims, 8 Drawing Sheets

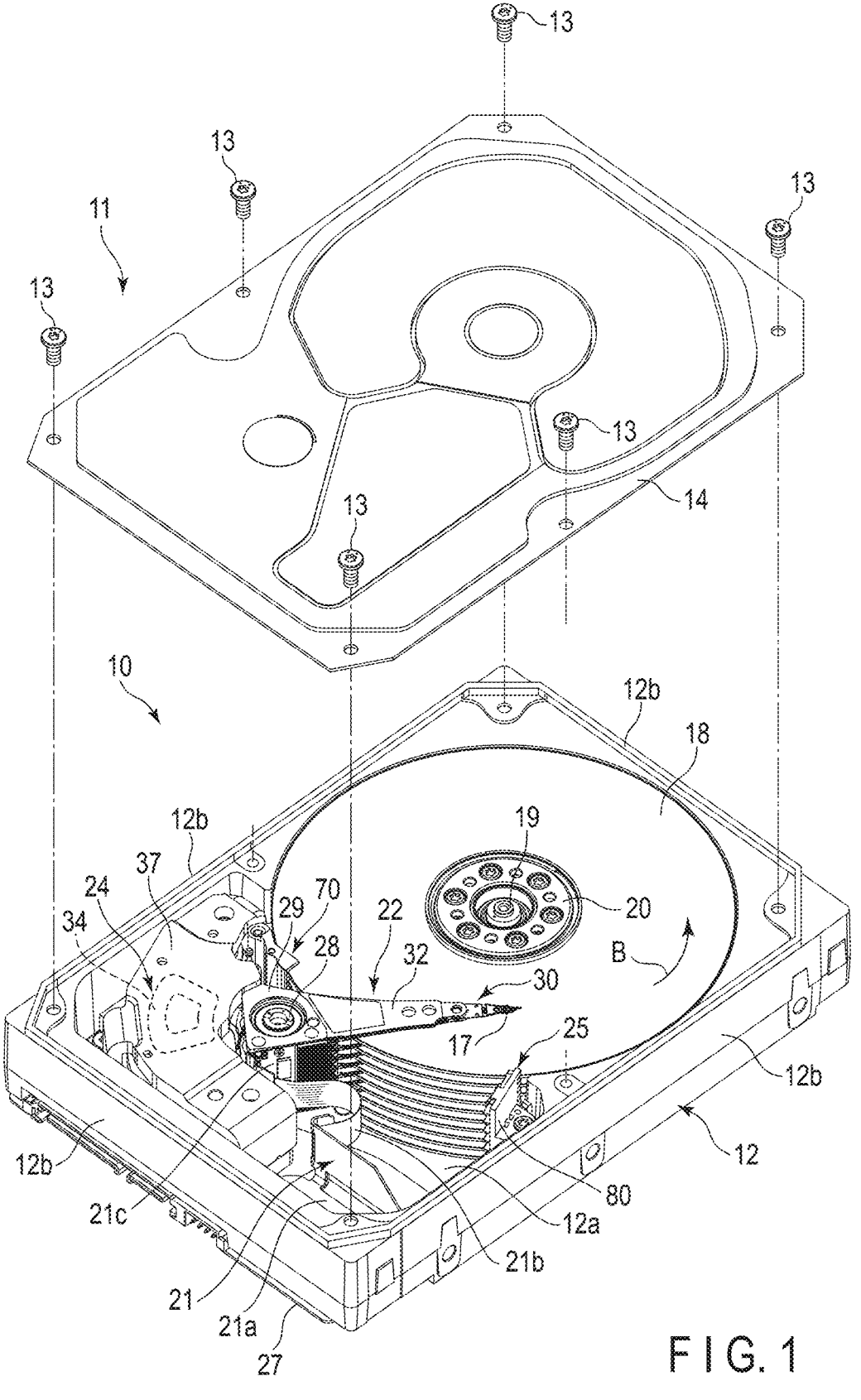
F I G. 1

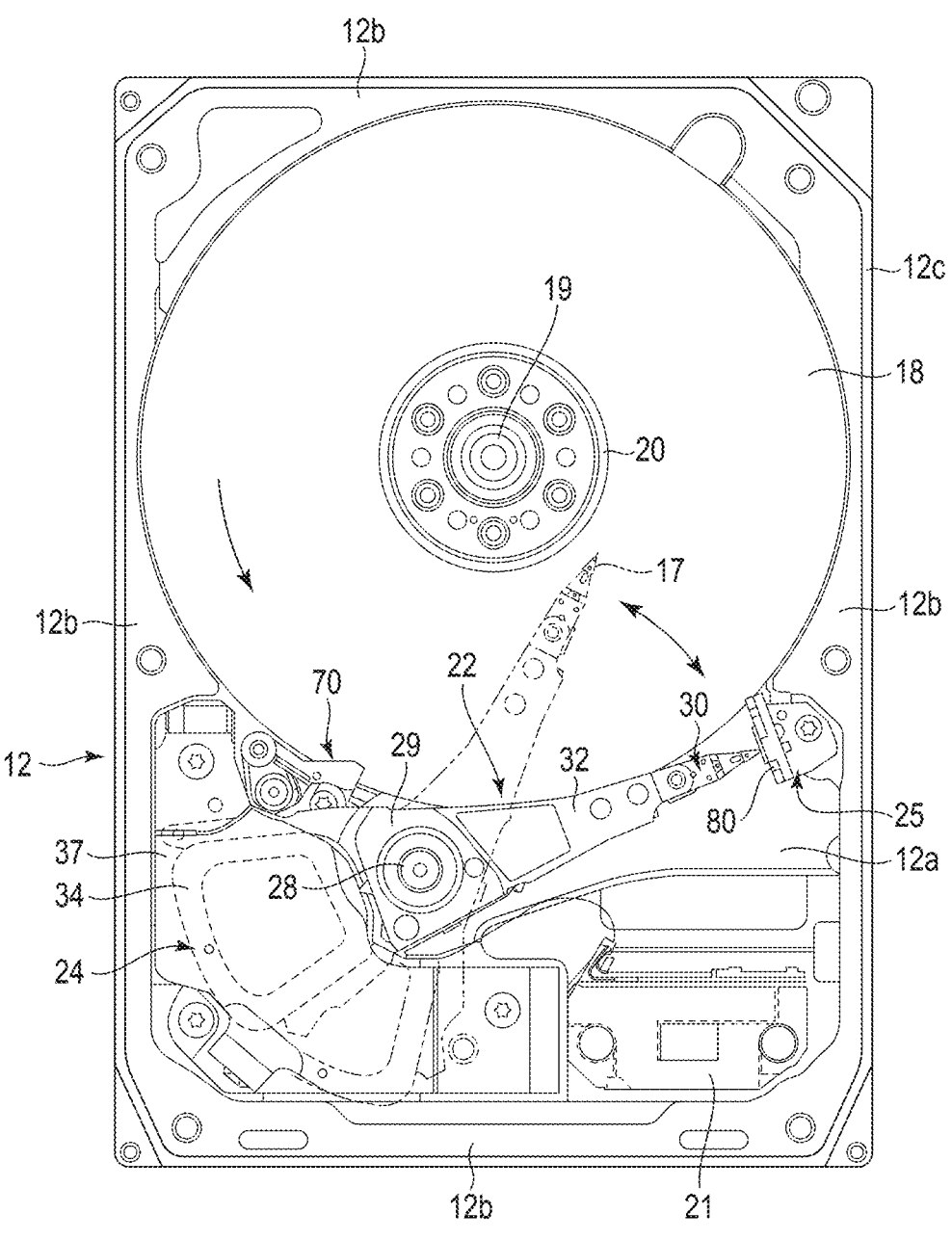
F I G. 2

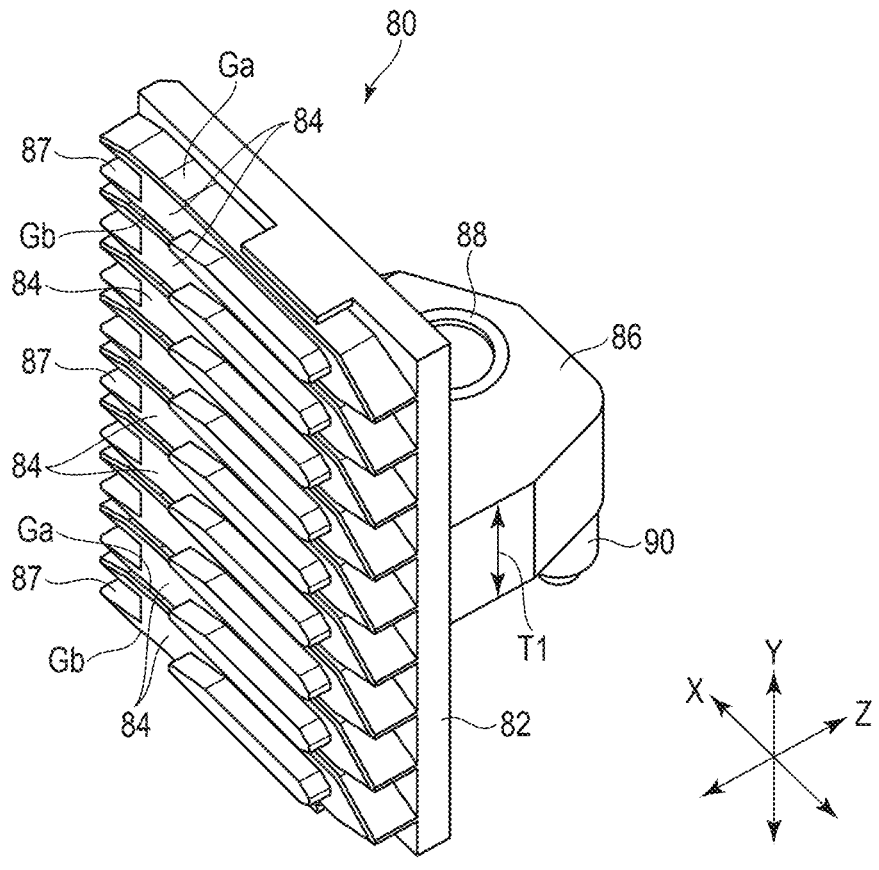
F I G. 4

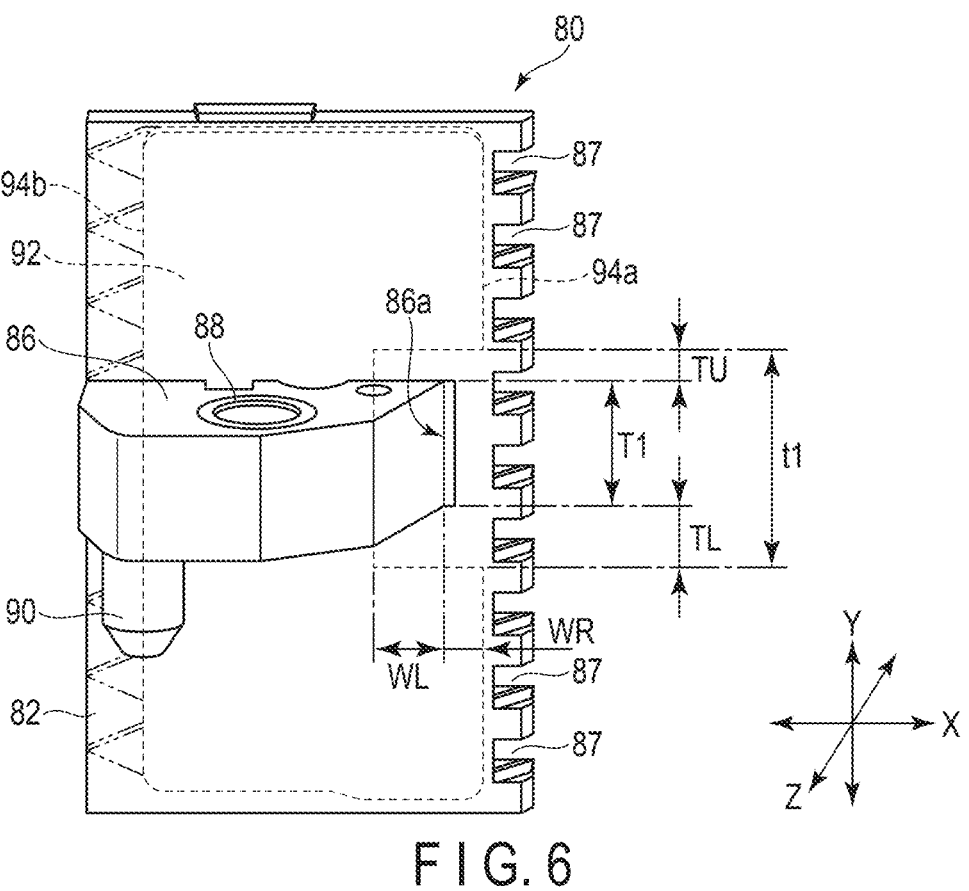
F I G. 6
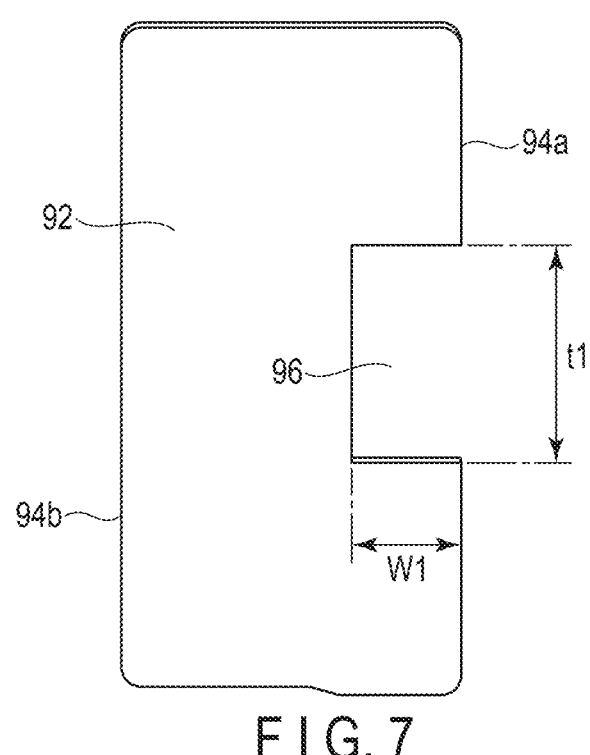
F I G. 7

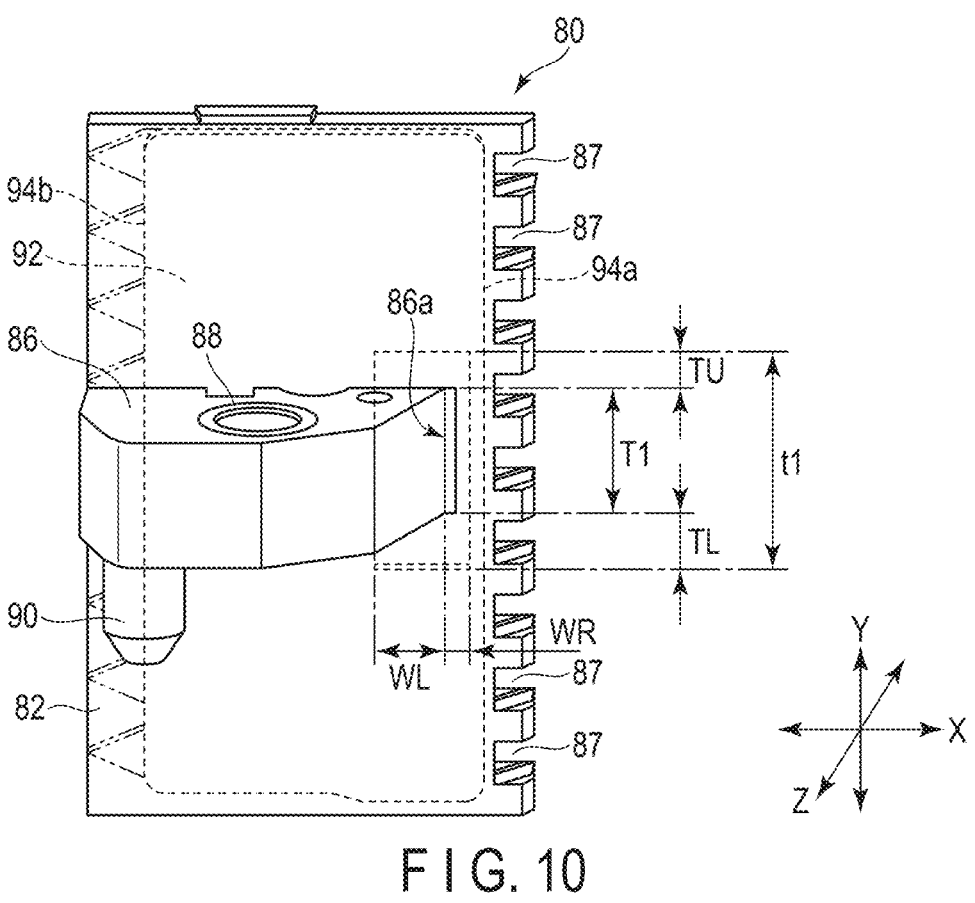
F I G. 10
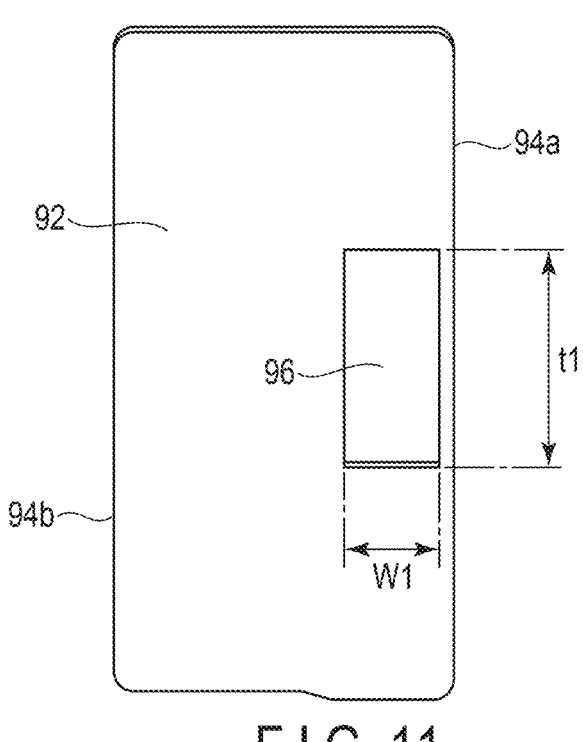
F I G. 11

RAMP AND MAGNETIC DISK DEVICE

CROSS-REFERENCE TO RELATED APPLICATIONS

This application is based upon and claims the benefit of priority from Japanese Patent Application No. 2024-063440, filed Apr. 10, 2024, the entire contents of which are incorporated herein by reference.

FIELD

Embodiments described herein relate generally to a ramp and a magnetic disk device.

BACKGROUND

As a magnetic disk device, for example, a hard disk drive (HDD) comprises magnetic disks arranged to be rotatable, and magnetic heads that read and write information to and from the magnetic disk. The magnetic heads are moved by a head actuator between a load position on the magnetic disk and an unload position located on an outside of a respective magnetic disk. Further, the HDD comprises a ramp that holds the magnetic heads moved to the unload position. Generally, the ramp is molded from synthetic resin.

On the other hand, in recent years, the number of magnetic disks mounted on HDDs tends to increase as the capacity of HDDs increases. As the number of magnetic disks increases, the ramp as well tend to become larger. When a ramp has a larger size, a metal reinforcement plate may be embedded in the ramp for reinforcement in some cases.

Here, resin and metal have different coefficients of linear expansion. When the ramp is subjected to temperature changes, a difference in expansion occurs between the resin-made ramp and the metal reinforcement plate, thus causing thermal stress. Therefore, repeated temperature changes may cause cracks in corner portions of the resin part. If cracks occur, the dimensions of the ramp may shift, which may interfere with the loading and unloading operations of the magnetic heads.

BRIEF DESCRIPTION OF THE DRAWINGS

FIG. 1 is an exploded perspective view showing a hard disk drive (HDD) according to a first embodiment, when a top cover thereof is disassembled.

FIG. 2 is a plan view of the HDD.

FIG. 4 is a perspective view showing a front surface side of the ramp of the HDD.

FIG. 6 is a perspective view showing a rear surface side of the ramp and a reinforcement plate.

FIG. 7 is a perspective view showing the reinforcement plate.

FIG. 10 is a perspective view showing a rear surface side of a ramp and a reinforcement plate in an HDD according to a second embodiment.

FIG. 11 is a perspective view showing the reinforcement plate in the HDD of the second embodiment.

DETAILED DESCRIPTION

Figure 3:
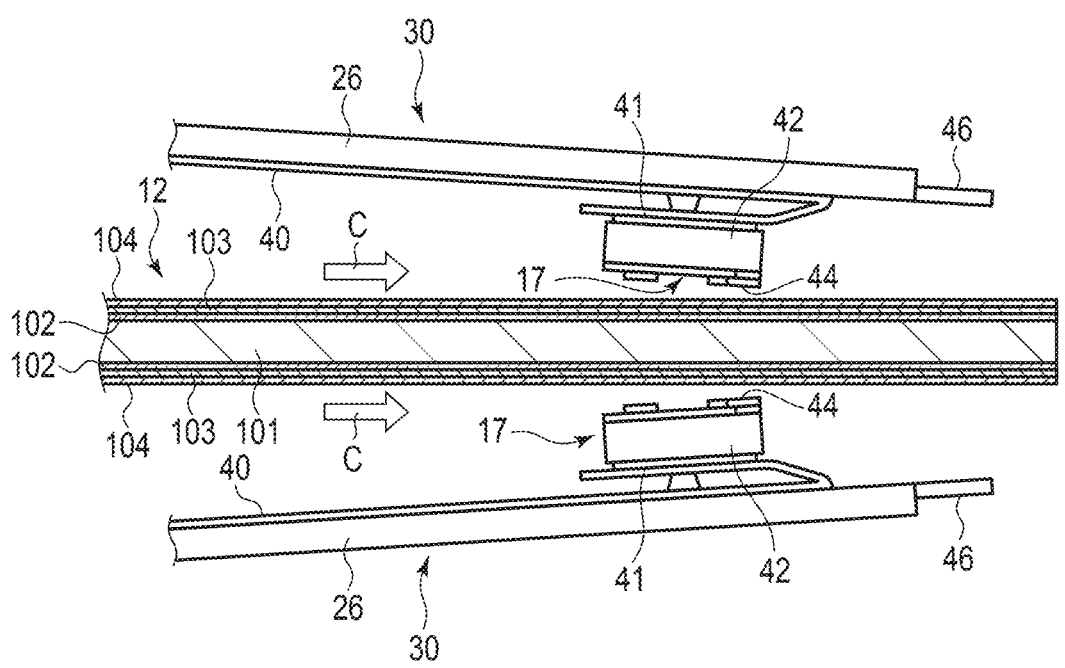
FIG. 3 is a side view schematically showing magnetic heads, suspensions, and a magnetic disk in the HDD.

Various embodiments will be described hereinafter with reference to the accompanying drawings. In general, according to one embodiment, a ramp of a magnetic disk device comprises a ramp main body and a support bracket molded to be integrated as one body from resin and a metal reinforcement plate embedded in the ramp main body and opposing the support bracket. The reinforcement plate includes an opening which opposes a border portion between the ramp main body and the support bracket and is filled with the resin.

Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

As a disk device, a hard disk drive (HDD) according to the first embodiment will be described in detail. FIG. 1 is a perspective view of the HDD of the first embodiment, when a cover thereof is removed, and FIG. 2 is a plan view of the HDD when the cover is removed.

As shown in FIG. 1, the HDD comprises a substantially rectangular-shaped housing 10. The housing 10 has a rectangular box-shaped base 12 with an open top surface and a cover (top cover) 14 that is screwed to the base 12 with a plurality of screws 13 to close the top opening of the base 12. The base 12 includes a rectangular bottom wall 12a opposing the cover 14 with a gap therebetween, and side walls 12b formed to stand along peripheral edges of the bottom wall 12a, which are molded to be integrated as one body, for example, from an aluminum alloy. The side walls 12b include a pair of long side walls opposing each other and a pair of short side walls opposing each other. The cover 14 is formed into a rectangular plate shape, for example, from stainless steel. The cover 14 is screwed to the top surface of the side walls 12b by screws 13 at its peripheral edge portions.

Inside the housing 10, there are a plurality of, for example, nine magnetic disks 18 provided as disk-shaped recording media, and a spindle motor 19 that supports and rotates the magnetic disks 18. The spindle motor 19 is disposed on the bottom wall 12a. The magnetic disks 18 are each formed as a discoidal plate having, for example, 96 mm (3.5 inches) in diameter, and include a substrate made of a non-magnetic material, for example, glass or aluminum, and a magnetic recording layer formed on each of an upper surface (first surface) and a lower surface (second surface) of the substrate. The magnetic disks 18 are fitted to the hub of the spindle motor 19 coaxially with respect to each other and are further cramped by a cramping spring 20. With this configuration, the magnetic disks 18 are supported in respective positions parallel to the bottom wall 12a of the base 12. The magnetic disks 18 are rotated by the spindle motor 19 in the direction of arrow B at a predetermined rotation speed. The number of magnetic disks 18 mounted is not limited to nine, but may be eight or fewer, or ten or more.

As shown in FIGS. 1 and 2, the housing 10 contains a plurality of magnetic heads 17 that record and reproduce information with respect to the respective magnetic disks 18, and an actuator assembly, which may as well be referred to as a head stack assembly (HSA)) 22 that supports the magnetic heads 17 to be movable with respect to the corresponding magnetic disks 18. Further, in the housing 10, there are provided a voice coil motor (VCM) 24 that rotates and positions the actuator assembly 22, a ramp load mechanism 25 that holds the magnetic head 17 in an unloaded position away from the respective magnetic disk 18 when the magnetic head 17 is moved to the outermost circumferential periphery of the magnetic disk 18, a substrate board unit (FPC unit) 21 on which electronic components such as conversion connectors are mounted, and a spoiler 70. Note that the actuator assembly 22 and the VCM 24 constitute the head actuator.

To the outer surface of the bottom wall 12a of the base 12, a printed circuit board 27 is fixed by screws. The printed circuit board 27 constitutes a control unit that controls the operation of the spindle motor 19, as well as controls the VCM 24 and the magnetic heads 17 via the board unit 21.

The actuator assembly 22 includes an actuator block 29 supported to be rotatable around a support shaft 28, a plurality of arms 32 extending from the actuator block 29, and a suspension assembly 30 extending from each of the arms 32. The support shaft 28 is provided to stand on the bottom wall 12a. Each magnetic head 17 is supported at a distal portion of each respective suspension assembly 30.

The actuator assembly 22 includes a support frame, not shown, extending from the actuator block 29 in a direction opposite to the arm 32, and the voice coil 34 is supported by the support frame. The voice coil 34 is located between a pair of yokes 37 fixed on the base 12, and these yokes 37 and a magnet fixed to either one of the yokes all together constitute the VCM 24.

The FPC unit 21 includes a base portion 21a fixed to the bottom wall 12a, a slender belt-shaped relay portion 21b extending from the base portion 21a, and a joint portion 21c continuously provided at a distal end of the relay portion 21b. The base portion 21a, the relay portion 21b, and the joint portion 21c are formed from a flexible printed circuit board (FPC). The joint portion 21c is attached to the actuator block 29.

FIG. 3 is a side view of magnetic heads and a magnetic disk in a levitated state.

As shown, the magnetic disk 18 includes a disk-shaped substrate 101 made of a non-magnetic material, for example, glass. On each of the surfaces of the substrate 101, an underlying layer 102, a magnetic recording layer 103, and a protective film 104 are stacked in this order. The magnetic disk 18 is rotated at a predetermined speed by the spindle motor 19.

The suspension assemblies 30 each include a suspension 26, a wiring member (flexure) 40 mounted on the suspension 26, and a tab 46 protruding from the distal end of the suspension 26. The magnetic head 17 is supported by a gimbal portion 41 of the respective wiring member 40. The magnetic head 17 is electrically connected to the FPC unit 21 via the wiring member 40.

The magnetic head 17 is configured as a levitating head and includes a slider 42 formed into an approximately rectangular parallelepiped shape and a head portion 44 formed at an outflow (trailing) end of the slider 42. The head portion 44 includes a write head and a read head. The magnetic head 17 is maintained in a flying state by a predetermined distance from the surface of the respective magnetic disk 18 by an air flow C generated between the surface of the disk and the slider 42 by the rotation of the magnetic disk 18. The direction of the air flow C coincides with the direction of rotation B of the magnetic disk 18.

As shown in FIGS. 1 and 2, when the actuator assembly 22 is assembled into the base 12, the support shaft 28 is provided to stand substantially parallel to the spindle of the spindle motor 19. The actuator assembly 22 is supported to be rotatable around the support shaft 28 and can be pivoted between the unloaded position (position indicated by solid line in FIG. 2) where the respective magnetic head 17 is unloaded to an outside of the outermost circumference of the magnetic disk 18 and an inner circumferential position (position indicated by two dotted line in FIG. 2) where the magnetic head 17 is located on the innermost circumferential side of the magnetic disk 18. Each magnetic disk 18 is positioned between two suspension assemblies 30. When the HDD is in operation, the respective magnetic heads 17 supported by the two suspension assemblies 30 oppose the upper surface and lower surface of the magnetic disk 18, respectively.

The ramp load mechanism 25 comprises a ramp 80. The ramp 80 is fixed to the base 12 and located near the peripheral portion of the magnetic disk 18. When the HDD is not in operation and the magnetic head 17 is moved out from the outer circumference of the magnetic disk 18 to a predetermined unload position, the tab 46 of the suspension assembly 30 runs on the ramp 80. In this manner, the magnetic head 17 is kept in the unloaded position spaced apart from the magnetic disk 18.

Next, the ramp 80 of the ramp load mechanism 25 will be described.

Figure 5:
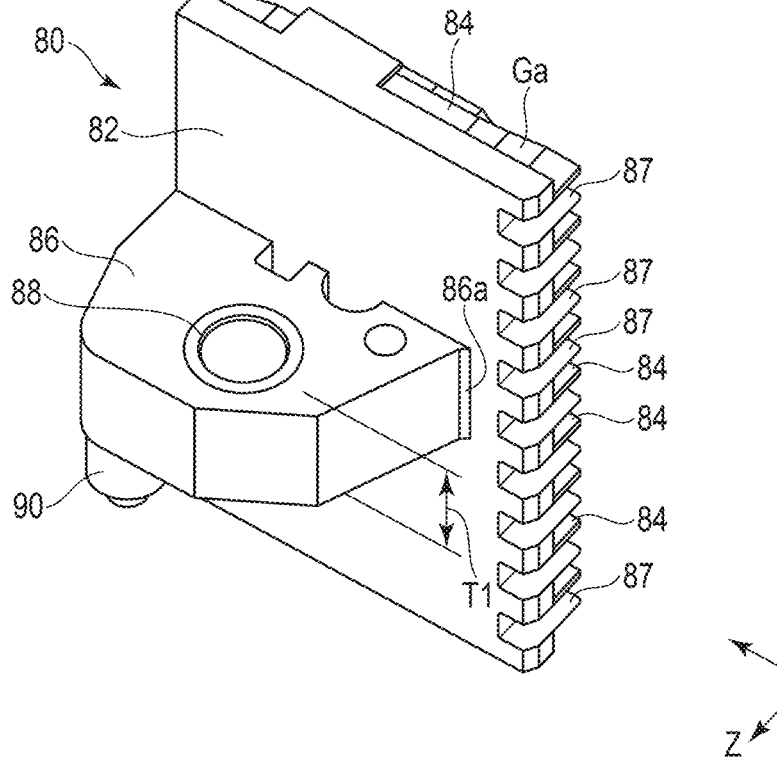
FIG. 5 is a perspective view showing a rear surface side of the ramp.

FIG. 4 is a perspective view showing a guide block side of the ramp, and FIG. 5 is a perspective view showing a rear surface side of the ramp.

As shown in FIGS. 4 and 5, the ramp 80 includes a main body (ramp main body) 82 formed into a rectangular plate shape, nine guide blocks 84 protruding from one surface of the main body 82, and a support bracket 86 protruding from the other surface of the main body 82, which are all molded to be integrated as one body, for example, from synthetic resin. In the figure, the height direction (first direction) of the ramp 80 is defined as the Y direction, the width direction (second direction) as the X direction, and the thickness direction as the Z direction.

The guide blocks 84 each have a slender rectangular parallelepiped shape and extend in the width direction X. The nine guide blocks 84 are aligned in the height direction Y, that is, the axial direction of the magnetic disk 18 at predetermined intervals. At one end on a magnetic disk 18 side of each of the guide blocks 84, a rectangular-shaped recess (notch) 87 is formed. The recesses 87 are formed over the main body 82.

Each of the guide blocks 84 includes an upper guide surface (first guide surface) Ga that guides and supports the tab 46 of the respective suspension assembly 30 and a lower guide surface (second guide surface) Gb that guides and supports the tab 46 of the respective suspension assembly 30. The upper guide surface Ga and the lower guide surface Gb are provided to oppose each other and approximately perpendicular to one surface of the main body 82.

The upper guide surface Ga and the lower guide surface Gb of each of the nine guide blocks 84 are aligned with the heights of the corresponding suspension assemblies 30. Each of the guide surface Ga and guide surface Gb extends approximately in the radial direction of the respective magnetic disk 18 to near the outer circumferential edge of the magnetic disk 18 and is located on the route path of the respective tab 46.

The support bracket 86 extends from the other (rear) surface of the main body 82 substantially vertically, that is, in the thickness direction Z. The support bracket 86 is provided to stand approximately at a center of the main body 82 in the height direction Y. The support bracket 86 has a constant thickness T1 in the height direction Y. The support bracket 86 extends in the width direction X from one end of the main body 82 in the width direction X to near the other end (the end on a magnetic disk 18 side). Since a plurality of recesses 87 are formed in the other end (one long side) of the main body 82, one end portion 86*a* of the support bracket 86 in the width direction X is spaced apart from the other end of the main body 82 by a predetermined distance. The one end portion 86*a* extends in the height direction Y by an equivalent amount to the thickness T1. The one end portion 86*a* may as well be referred to as a border portion between the ramp body 82 and the support bracket 86 or a corner. In the direction of extension (width direction X) of the support bracket 86, the thickness of the ramp 80 in the thickness direction Z changes abruptly at the location of the one end portion 86*a*.

A sleeve 88 is embedded in the support bracket 86. The sleeve 88 includes a central axis extending in the height direction Y and is opened in the upper surface and lower surface of the support bracket 86. A screw for fixing the ramp is inserted to through the sleeve 88. A positioning pin 90 is provided to protrude from the lower surface of the support bracket 86 (the surface of the base bottom wall). The positioning pin 90 has a central axis extending in the height direction Y.

FIG. 6 is a perspective view of the rear surface side of the ramp and FIG. 7 is a perspective view of the reinforcement plate.

As indicated by dashed line in FIG. 6, a metal reinforcement plate 92 is embedded within the main body 82. The reinforcement plate 92 is formed into a rectangular shape with dimensions slightly smaller than those of the main body 82, extends over substantially the entire surface of the main body 82, and opposes the support bracket 86. The reinforcement plate 92 includes a pair of long sides 94*a* and 94*b* opposing each other. The pair of long sides 94*a* and 94*b* extend in the height direction Y to be approximately parallel to the pair of long sides of the main body 82 and are further spaced slightly inward from the pair of long sides of the main body 82, respectively.

As shown in FIGS. 6 and 7, the reinforcement plate 92 comprises an opening (clearance) 96 formed on a one long side 94*a* side thereof. In this embodiment, the opening 96 is made to open in the long side 94*a*. In one example, the opening 96 is formed into a rectangular shape. The opening 96 has a length t1 in the height direction Y and a width W1 in the width direction X.

With the reinforcement plate 92 embedded in the main body 82, the opening 96 opposes the one end portion 86*a* of the support bracket 86. More specifically, the one end portion 86*a* is located within an area opposing the opening 96. The opening 96 has an area larger than that of the one end portion 86*a* to the extent that the lowering in strength of the reinforcement plate 92 is minimized. Note that with the reinforcement plate 92 embedded in the main body 82, the opening 96 is filled with resin and forms part of the main body 82.

The distances between the one end portion 86*a* and peripheral edges of the opening 96 in plan view (when the main body is viewed from a direction perpendicular to the rear surface of the main body 82 or the opening 96) are set as follows. In the height direction Y, the interval between the upper end of the one end portion 86*a* and the upper edge of the opening 96 is referred to as TU, the interval between the lower end of the one end portion 86*a* and the lower edge of the opening 96 is TL, and in the width direction X, the interval between the one end portion 86*a* and the right edge of the opening 96 is WR, the interval between the one end portion 86*a* and the left edge of the opening 96 is WL. In this case, the intervals TU, TL, WR, and WL are set larger than zero and smaller than an arbitrary upper limit, that is, in one example, the thickness T1 of the support bracket 86. More preferably, for example, they are set to the relationships: T1/5≤TU, TL, WR≤T1/2, and T1/5≤WL≤T1×2/3.

Note here that the criteria for the intervals TU, TL, WR, and WL are not limited to the thickness T1 of the support bracket 86, but various referential values can be selected. Alternatively, the intervals TU, TL, WR, and WL may be specified to be in a numerical range, for example, 0.5 to 3 mm.

In this embodiment, the main body 82 and the support bracket 86 are molded to be integrated as one body from resin, and the reinforcement plate 92 is formed of a material different from resin, for example, metal. The resin can be, for example, polyacetal resin, liquid crystal polymer, or polyetherimide. As the metal, for example, stainless steel SUS304, stainless steel SUS430, aluminum alloy or the like can be used.

For example, in the case of a combination of polyacetal resin (coefficient of linear expansion: $11 \times 10^{-5}$ (1/K)) and SUS304 (coefficient of linear expansion: $1.73 \times 10^{-5}$ (1/K)), they differ in coefficient of linear expansion by a factor of 6 or more. The resin has a relatively large deformation against temperature, while the metal includes a relatively small deformation against temperature. Therefore, stress due to the difference in relative deformation occurs in the vicinity of the contact surfaces of the two. In the ramp 80 of this embodiment, on an assumption that there is not the opening 96, the effect by the difference in linear expansion coefficient is great in the support bracket 86, where a large amount of resin is involved and the contact distance with the reinforcement plate 92 is long, and stress is likely to occur at one end (one end in the width direction X) of the support bracket 86, that is, one end (corner portion or border portion) 86*a*. In particular, due to the shape characteristics that the thickness of the ramp 80 in the thickness direction Z changes abruptly at the location of the one end portion 86*a*, stress is likely to be concentrated at the one end portion 86*a*.

In order to avoid this, according to the present embodiment, the reinforcement plate 92 is configured to be provided with the opening 96 located in the area opposing the one end portion 86*a* of the support bracket 86, and to fill the resin into the opening 96. In other words, there is no metal plate present in the area opposing the one end portion 86*a*. With this configuration, the difference in relative deformation at the one end portion 86*a* can be eliminated, thereby making it possible to reduce the stress generated at the one end portion 86*a*.

Figure 8:
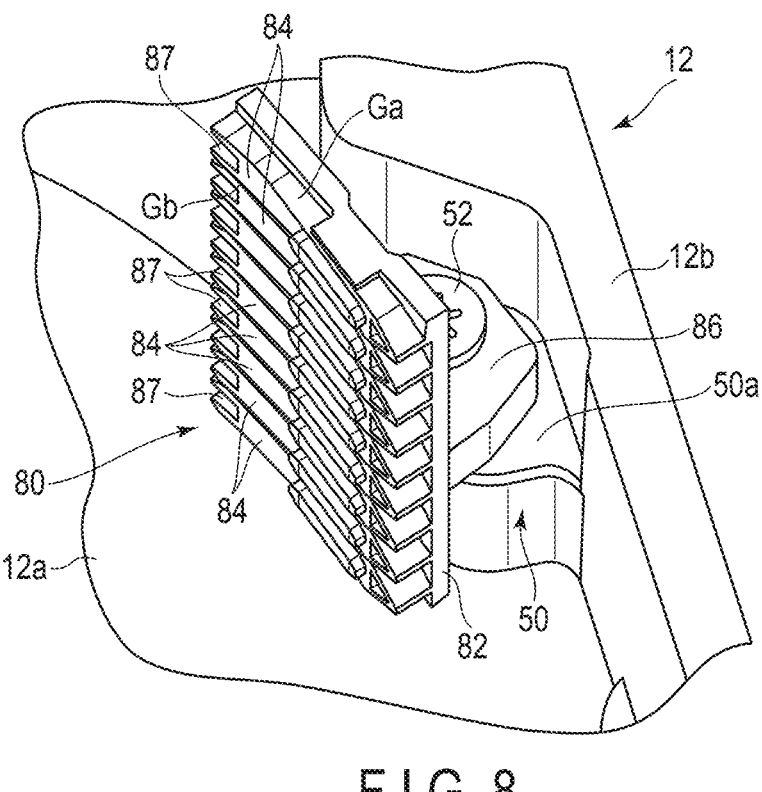
FIG. 8 is a perspective view showing a ramp instalment portion of a housing of the HDD, and the ramp.

FIG. 8 is a perspective view showing a ramp installation portion of the housing of the HDD, and the ramp.

As shown in FIG. 8, the base 12 of the housing 10 includes a ramp installation portion 50 on which the ramp 60 is to be installed, as an integrated one body. The ramp installation portion 50 is provided to protrude as a mount portion at a corner portion between the bottom wall 12*a* and the side wall 12*b* of the base 12. The ramp installation portion 50 includes a flat installation surface 50*a*. The installation surface 50*a* is located approximately midway in the height direction of the side wall 12*b* and extends approximately parallel to the bottom wall 12*a*.

The support bracket 86 of the ramp 80 described above is placed on the installation surface 50*a* and is further secured to the installation surface 50*a* by a fixing screw 52. The fixing screw 52 is screwed into the installation surface 50*a* through a sleeve 88 of the support bracket 86. The main body 82 is positioned in an approximately vertical upright position with respect to the bottom wall 12*a* of the base 12. Each of the guide blocks 84 is located near the peripheral portion of the corresponding magnetic disk 18.

With the ramp 80 installed in the ramp installation section 50, the outer circumferential portions of the nine magnetic disks 18 are positioned within the recesses 87 of the corresponding guide blocks 84, respectively, each with a gap therebetween.

Figure 9:
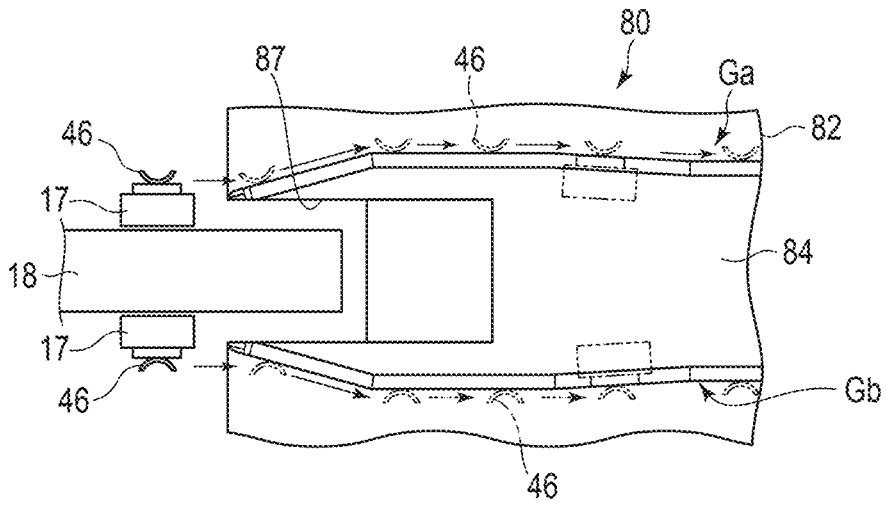
FIG. 9 is a partially enlarged view of the ramp.

FIG. 9 is a partially enlarged side view of a magnetic disk, magnetic heads, and the ramp. As shown, when the HDD is not in operation and the magnetic heads 17 are moved out from the outer circumference of the magnetic disk 18 toward the unloaded position, the tab 46 of the suspension assembly 30 runs up on the upper guide surface Ga or lower guide surface Gb of the ramp 80. Further, the tab 46 moves along the upper guide surface Ga or lower guide surface Gb of the ramp 80 to the unload position and stops. As a result, the magnetic head 17 is held in the unloaded position by the ramp 80, which is spaced apart from the magnetic disk 18.

According to the HDD of the first embodiment configured as described above, the ramp 80 is formed such that the opening 96 is made in the reinforcement plate 92, so as to be located in an area opposing the one end portion 86*a* of the support bracket 86, and the opening 96 is filled with resin. With this configuration, the difference in relative deformation at one end portion 86*a* of the support bracket 86 can be eliminated and the stress to be generated at the one end portion 86*a* can be reduced. Thus, it is possible to suppress the occurrence of cracks in the ramp 80.

As described above, according to the first embodiment, it is possible to provide a ramp which can suppress the occurrence of cracks and improve the reliability, and further a magnetic disk device comprising such a ramp.

Next, a ramp of an HDD according to another embodiment will be described. In the other embodiment provided below, parts identical to those in the first embodiment described above will be denoted by the same reference symbols, and their detailed descriptions will be omitted or simplified. The detailed descriptions will focus on parts that differ from those of the first embodiment.

Second Embodiment

FIG. 10 is a perspective view showing a rear surface side of a ramp of an HDD according to the second embodiment, and FIG. 11 is a perspective view of a reinforcement plate of the ramp.

As shown in the figures, a metal reinforcement plate 92 is embedded in the main body 82 of the ramp 80. The reinforcement plate 92 is formed into a rectangular shape with dimensions slightly smaller than those of the main body 82 and extends over substantially the entire surface of the main body 82. A pair of long sides 94*a* and 94*b* of the reinforcement plate 92 extend approximately parallel to a pair of long sides of the main body 82 and are further spaced apart slightly inward from the pair of long sides, respectively.

The reinforcement plate 92 comprises an opening (clearance) 96 formed on a side of one long side 94*a*. In the second embodiment, the opening 96 is formed in a closed rectangular shape. That is, the opening 96 is not opened to the long side 94*a* of the reinforcement plate 92. The long side of the opening 96 opposes the long side 94*a* of the reinforcement plate 92 in parallel with an interval between them. A strip of metal plate extends between the long side of the opening 96 and the long side 94*a* of the reinforcement plate 92.

With the reinforcement plate 92 embedded in the main body 82 of the ramp, the opening 96 opposes one end portion 86*a* of the support bracket 86. The one end portion 86*a* is located within the area opposing the opening 96. Further, with the reinforcement plate 92 embedded in the main body 82, the opening 96 of the reinforcement plate 92 is filled with resin so as to form a part of the main body 82.

The size and dimensions of the opening 96 relative to the one end portion 86*a* are substantially identical to those of the ramp 80 of the first embodiment described above. In detail, the distances TU, TL, WR, WL between the one end portion 86*a* and peripheral edges of the opening 96 are set greater than zero and less than the thickness T1 of the support bracket 86. More preferably, they are set to the relationships, for example, $T1/5 \le TU$, TL, $WR \le T1/2$ and $T1/5 \le WL \le T1 \times 2/3$.

Note that the criteria for the intervals TU, TL, WR, and WL are not limited to the thickness T1 of the support bracket 86, but various referential values can be selected. Alternatively, the intervals TU, TL, WR, and WL may be specified to be in a numerical range, for example, 0.5 to 3 mm.

In the second embodiment, other configurations of the ramp and HDD are identical to those of the ramp and HDD in the first embodiment.

In the second embodiment configured as described above as well, advantageous effects similar to those of the ramp and HDD in the first embodiment can be obtained. In other words, according to the second embodiment, it is possible to provide a ramp which can suppress the occurrence of cracks and improve the reliability, and further a magnetic disk device comprising such a ramp.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the magnetic disk device, the number of magnetic disks and the number of magnetic heads can be increased or decreased as needed, and the size of the magnetic disks can be selected in various ways. The dimensions of the main body of the ramp and the number of guide blocks can be adjusted according to the number of magnetic disks installed.

Moreover, one end (corner portion or border portion) of the support bracket is not limited to one location, but may be present in multiple locations. In such a case, the reinforcement plate is formed to comprise a plurality of openings or notches opposing the end portions (corner portions or border portions) at the multiple locations, respectively.

What is claimed is:

1. A ramp of a magnetic disk device, comprising:

a ramp main body and a support bracket molded to be integrated as one body from resin; and a metal reinforcement plate embedded in the ramp main body and opposing the support bracket, the reinforcement plate including a pair of side edges each extending in a first direction and opposing each other; wherein the support bracket extends in a second direction intersecting the first direction, the reinforcement plate includes an opening filled with the resin and opposing a border portion between the ramp main body and the support bracket, the border portion extends in the first direction by an amount equivalent to the thickness of the support bracket, and in plan view, an interval between a periphery of the opening and the border portion is greater than zero and less than a thickness of the support bracket in the first direction.

2. The ramp of claim 1, wherein the opening is open to one of the side edges.

3. The ramp of claim 1, wherein the opening includes a side periphery opposing one of the side edges with an interval between them.

4. The ramp of claim 1, wherein where an interval between an upper periphery of the opening and the border portion is referred to as TU, an interval between a lower periphery of the opening and the border portion is TL, an interval between a side periphery of the opening and the border portion is WR, an interval between other side periphery of the opening and the border portion is WL, and a thickness of the support bracket in the first direction is T1, the ramp has relationships: T1/5≤TU, TL, WR≤T1/2, and T1/5≤WL≤T1×2/3.

5. A magnetic disk device comprising:

a rotatable magnetic disk;

an actuator which supports and drives a head to be movable with respect to the magnetic disk;

a ramp which holds the head at an unloaded position on an outer side of the magnetic disk, wherein the ramp comprises:

a ramp main body and a support bracket molded to be integrated as one body from resin; and a metal reinforcement plate embedded in the ramp main body and opposing the support bracket, the reinforcement plate including a pair of side edges each extending in a first direction and opposing each other;

the support bracket extends in a second direction intersecting the first direction, the reinforcement plate includes an opening filled with the resin and opposing a border portion between the ramp main body and the support bracket, the border portion extends in the first direction by an amount equivalent to the thickness of the support bracket, and in plan view, an interval between a periphery of the opening and the border portion is greater than zero and less than a thickness of the support bracket in the first direction.

6. The magnetic disk device of claim 5, wherein the opening is open to one of the side edges.

7. The magnetic disk device of claim 5, wherein the opening includes a side periphery opposing one of the side edges with an interval between them.

8. The magnetic disk device of claim 5, wherein where an interval between an upper periphery of the opening and the border portion is referred to as TU, an interval between a lower periphery of the opening and the border portion is TL, an interval between a side periphery of the opening and the border portion is WR, an interval between other side periphery of the opening and the border portion is WL, and a thickness of the support bracket in the first direction is T1, the ramp has relationships: T1/5≤TU, TL, WR≤T1/2, and T1/5≤WL≤T1×2/3.

* * * * *